United States Patent [19]

Pfister

[11] Patent Number: 4,881,643

[45] Date of Patent: Nov. 21, 1989

[54] CARRIER STRIP

[75] Inventor: Norbert Pfister, Buchs, Switzerland

[73] Assignee: Hilti Aktiengesellschaft, Fürstentum, Liechtenstein

[21] Appl. No.: 317,855

[22] Filed: Mar. 2, 1989

[30] Foreign Application Priority Data

Mar. 2, 1988 [DE] Fed. Rep. of Germany ....... 3806624

[51] Int. Cl.$^4$ .................... B65D 83/00; B65D 85/24; B65D 83/02
[52] U.S. Cl. .................................. 206/343; 206/345; 206/338
[58] Field of Search .............. 206/341, 343, 344, 345, 206/346, 347, 348, 338, 820

[56] References Cited

U.S. PATENT DOCUMENTS 3,097,360 7/1963 Carlson, Jr. et al. ............... 206/347
3,779,373 12/1973 Maier ................................... 206/346
3,812,961 5/1974 Merrick et al. ..................... 206/338
3,954,176 5/1976 Haytayan ............................ 206/820

Primary Examiner—Stephen Marcus
Assistant Examiner—Jacob Ackun, Jr.
Attorney, Agent, or Firm—Toren, McGeady & Associates

[57] ABSTRACT

A carrier strip supports a plurality of nails for use in an explosive powder charge operated setting device. The nails are equidistantly spaced apart and held in bores in the strip. Guidance members, placed on the nail shanks, hold the nails within the strip bores. The heads of the nails project outwardly from one side of the carrier strip. The outside diameter of the nail heads is not greater than the inside diameter of the strip bores, so that the nails can be pushed through the bores out of the carrier strip into a receiving material.

8 Claims, 1 Drawing Sheet

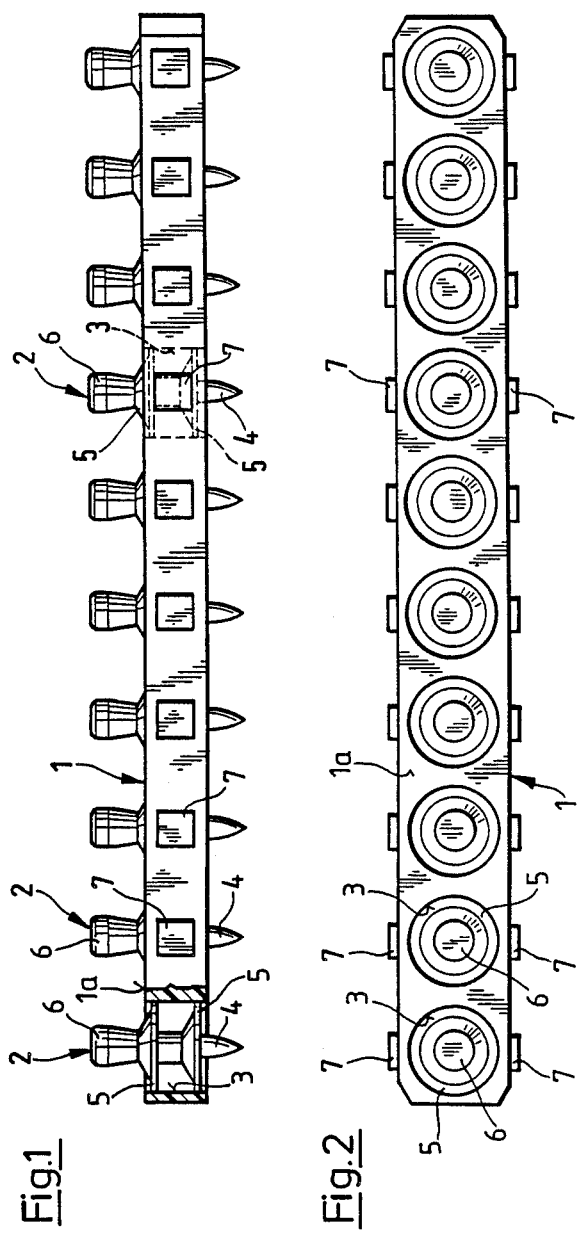

CARRIER STRIP

BACKGROUND OF THE INVENTION

The present invention is directed to a support or carrier strip for nails to be driven from an explosive powder charge operated setting device into a receiving material. The strip is elongated and the nails are spaced equidistantly apart and are displaceably supported within bores in the strip. Each nail has a head and a shank extending from the head with at least one guidance member positioned on the shank for holding the nail in a bore in the strip. The nail head has an outside diameter not greater than the inside diameter of the bore in the carrier strip.

In DE-OS 2 151 051, a carrier strip is disclosed with nails supported in bores in the strip. The nails are frictionally locked in the bore by a guidance member positioned on the nail shank. During the driving or setting procedure, the nails are driven individually out of the carrier strip by a driving piston within the setting device. When the nails are driven out of the strip, the strip exits from the barrel of the setting device through an outlet opening.

This known carrier strip requires a costly design for a conveying or transporting and arresting mechanism in the setting device. Moreover, there is the disadvantage that the positioning of the carrier strip takes place independently of the presence of a nail in a receiving bore. As a result, there is the considerable danger that the driving piston executes a driving stroke without driving a nail with a resultant damage to the setting device, as well as to the receiving material into which the nails are driven.

SUMMARY OF THE INVENTION

The primary object of the present invention is to provide a carrier strip which affords a simple transporting and arresting arrangement in a driving or setting device and prevents any stroke of the driving piston if a nail is not present in a bore in the carrier strip.

In accordance with the present invention, the nails are supported in the carrier strip so that the nail head projects outwardly from one surface of the strip. Accordingly, the nail heads can be used for positioning the carrier strip by running-up against a stop in the setting device, preferably located in the barrel of the device. The head cooperates with the stop so that, after the transport stroke of the carrier strip has taken place, for instance, by means of a spring-loaded slide, the nail which impacts with its head against the stop, is aligned with the axis of the barrel. If a nail is not present in one of the strip bores, the carrier strip continues to move in the transporting direction until the next nail head contacts the stop. In such an arrangement, the portion of the magazine or carrier strip free of nails leaves the barrel of the setting device through an outlet opening. Accordingly, it is assured that a nail is present in the barrel bore of the setting device after each transporting step of the carrier strip, whereby it is avoided that the driving piston is driven if no nail is present in a bore in the carrier strip.

Two disk-shaped guidance members spaced apart along the axial direction of the nail shank serve for retaining and guiding the nails in the bores of the carrier strip. The holding force for securing the nails can be applied by the elasticity of the carrier strip, preferably formed of a plastics material. Preferably, the nail heads project outwardly from the surface of the carrier strip with the region of the nail adjacent the head receiving the guiding member so that the region receiving the guidance member may include the head or a portion of the nail shank adjacent to the head and spaced from the head in the driving or setting direction. Such an adjacent portion can be in the form of an arc-shaped constriction or a conical zone. Accordingly, the projecting length of the nail can be achieved in the case of nail heads having a relatively small axial dimension so that the cooperation with the stop in the setting device is assured without functional impairment in the event the guidance of the carrier strip in the setting device involves very liberal tolerances.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is an elevational view of a carrier strip with inserted nails, shown partly in section, and incorporating the present invention; and FIG. 2 is a plan view of the carrier strip shown in FIG. 1.

DETAILED DESCRIPTION OF THE INVENTION

In FIG. 1, an elongated carrier strip 1 is shown holding a number of nails 2, equidistantly spaced apart in the long direction of the strip. The carrier strip has a plurality of bores 3 with a nail held within each of the bores. The nails have axially extending shanks 4, with the shanks extending transversely of the long direction of the strip. As shown in FIG. 1, each shank has two disk-shaped guidance members 5 secured on it with the guidance members being spaced apart in the axial direction of the shank. The disk-shaped guidance members 5 have a relatively flat conical configuration. The guidance members 5 are held under a preload in the bores 3 of the carrier strip formed of a plastics material. Each nail 2 has a head 6 at one end projecting outwardly from the surface of the upper side of the carrier strip. As viewed in FIG. 1, the lower end of the nail is its leading end so that, when driven, the head 6 passes through the carrier strip into a receiving material. In FIG. 1, the head 6 is cylindrically shaped with a conically shaped region extending from the cylindrically shaped section to the shank. The guidance member closer to the head 6 is fitted onto the smaller diameter end of the conically shaped section.

As can be seen from the combination of FIGS. 1 and 2, the carrier strip has a pair of elongated sides extending between the upper and lower sides of the strip with square shaped projections 7, projecting outwardly from them. As can be seen in FIG. 2, the projections 7 extend outwardly from the elongated sides. The elongated sides extend or connect the upper surface 1a from which the head projects, and the lower surface from which the leading end of the nail projects. The spacing between the projections 7 corresponds to the spacing of the nails 2. During use of the carrier strip, a nail 2 is forced by a driving piston in a setting device out of the corresponding bore 3. After the driving step, the carrier strip 1 is moved in its long direction until the next nail runs up against a stop in the setting device. A spring-loaded slide in the device can be used for moving the carrier strip 1 and acts on the end of the carrier strip or against the projections 7.

As viewed transversely of its elongated direction, the carrier strip has a rectangular shape. At the leading end and trailing end of the carrier strip, the sides from which the projection 7 extend, have leveled or chamfered surfaces.

While specific embodiments of the invention have been shown and described in detail to illustrate the application of the inventive principles, it will be understood that the invention may be embodied otherwise without departing from such principles.

I claim:

1. Carrier strip for elements to be driven into a receiving material by an explosive powder charge operated setting device, said carrier strip being elongated and having two pair of opposite sides extending in the elongated direction, one said pair of opposite sides comprising a first side and a second side disposed in spaced relation, a second said pair comprising two third sides disposed in spaced relation and extending between said first and second sides, said carrier strip having bores extending between said first and second sides and each said bore having a bore surface with an inside diameter, axially extending nails disposed in spaced relation and displaceably supported in said bores, each said nail has a head at one end and a shank extending axially from the head, at least one guidance member located on each said shank of said nails and extending radially outwardly therefrom into engagement with the bore surface for holding and supporting said nails in said strip, said heads of said nails having an outside diameter not greater than the inside diameter of sid bore surface, wherein the improvement comprises that said head projects axially outwardly from the first side of said strip.

2. Carrier strip, as set forth in claim 1, wherein at least the heads of said nails project outwardly from the first side of said carrier strip with said guidance member on each said nail located ajdacent to said first side of said strip.

3. Carrier strip, as set forth in claim 2, wherein another said guidance member located on each said shank adjacent said second side of said carrier strip and spaced from the one said guidance member.

4. Carrier strip, as set forth in claim 1, wherein said guidance member is disk-shaped and has a flat conical configuration tapering inwardly from the bore surface toward said head of said nail.

5. Carrier strip, as set forth in claim 1, wherein said nail head is cylindrically shaped and has a diameter greater than the diameter of said shank with a section tapering inwardly from said cylindrical section to said shank.

6. Carrier strip, as set forth in claim 1, wherein said third sides of said strip have projections extending outwardly therefrom with said projections located aligned on opposite sides of each of said bores.

7. Carrier strip, as set forth in claim 6, wherein said projections have a square cross section viewed in the elongated direction of said carrier strip.

8. Carrier strip, as set forth in claim 1, wherein said carrier strip has a rectangular cross section transverse to the elongated direction thereof.

* * * * *